US006370586B2

(12) United States Patent
Davis et al.

(10) Patent No.: US 6,370,586 B2
(45) **Date of Patent: *Apr. 9, 2002**

(54) MONITORING OF AN ELECTRONIC DEVICE WITH A SYSTEM MANAGEMENT CONTROLLER

(75) Inventors: Edward L. Davis, Milwaukie; Ronald D. Newman, Hillsboro, both of OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/183,498

(22) Filed: Oct. 30, 1998

(51) Int. Cl.[7] .............................................. G06F 15/173

(52) U.S. Cl. ....................... 709/244; 709/202; 709/204; 709/220; 709/224; 709/226; 370/254; 340/506

(58) Field of Search .................... 395/185.01; 370/254; 702/187; 709/204–226, 202, 220, 224, 244; 340/506; 714/48

(56) References Cited

U.S. PATENT DOCUMENTS 4,752,697 A 6/1988 Lyons et al.
5,455,933 A 10/1995 Schieve et al.
5,584,554 A * 12/1996 Moore et al. ............... 353/122
5,588,109 A 12/1996 Dickinson et al.
5,678,002 A 10/1997 Fawcett et al.
5,758,071 A * 5/1998 Burgess et al. ............. 709/220
5,796,633 A * 8/1998 Burgess et al. ............. 702/187
5,850,517 A * 12/1998 Verkler et al. .............. 709/202
5,917,808 A * 6/1999 Kosbab ...................... 370/254
5,927,050 A 7/1999 Houck et al.
5,974,547 A 10/1999 Klimenko
5,978,911 A 11/1999 Knox et al.
5,978,912 A 11/1999 Rakavy et al.
5,987,514 A * 11/1999 Rangarajan et al. ........ 709/224
6,006,016 A * 12/1999 Faigon et al. .......... 395/185.01
6,009,274 A 12/1999 Fletcher et al.
6,038,690 A 3/2000 Jacobson et al.
6,073,167 A * 6/2000 Poulton et al. ............. 709/206
6,085,244 A * 7/2000 Wookey et al. ............. 709/224
6,154,128 A * 11/2000 Wookey et al. ............. 340/506
6,173,128 B1 * 1/2001 Saber et al. .................. 399/24

OTHER PUBLICATIONS

"TP3464, TP3465 Microwrie Interface Device (MID)," National Semiconductor, Feb. 1994, 18 pgs.

U.S. Patent application No. 09/197,384 , Davis, filed Nov. 20, 1998.

* cited by examiner

*Primary Examiner*—Ayaz Sheikh
*Assistant Examiner*—Frantz Jean
(74) *Attorney, Agent, or Firm*—Blakely, Sokoloff, Taylor & Zafman LLP

(57) ABSTRACT

A method and apparatus for monitoring a computer system with a system management controller is described. The system management controller monitors the status of various system components to determine whether the respective system components are operating within respective predetermined operating ranges. The system management controller is capable of taking corrective action. In one embodiment, a system management controller runs a Transmission Control Protocol/Internet Protocol (TCP/IP) stack independent of the system and reports problems to a network server or other remote device. In one embodiment, the system management controller obtains a Media Access Controller (MAC) address and communicates operating faults to the remote device. In an alternative embodiment, the system management controller communicates system component faults to a remote device via a modem or other device. In one embodiment, in addition to detecting system component failures, the system management controller of the present invention detects whether system components have been unexpectedly removed from the electronic device, for example, as the result of a theft or destruction.

19 Claims, 7 Drawing Sheets

100
FAN CONTROL 132
FAN(S) 130
EEPROM 170
CLOCK 125
PROCESSOR 102
POWER SUPPLY 120
BIOS 160
SYSTEM MANAGEMENT CONTROLLER 150
MEMORY 106
CHIP SET 104
VIDEO DEVICE 108
SYSTEM BUS 110
NETWORK INTERFACE 140
SERIAL INTERFACE 145

MONITORING OF AN ELECTRONIC DEVICE WITH A SYSTEM MANAGEMENT CONTROLLER

FIELD OF THE INVENTION

The present invention relates to electronic devices, such as computer systems. More particularly, the present invention relates to monitoring of an electronic device with a system management controller.

BACKGROUND

Typical prior art electronic devices such as computer systems have multiple system components that are designed to operate within predetermined operating parameters. Some system components are self-monitoring. When a system component operates outside of predetermined operating parameters, corrective action is taken by the component. For example, when a processor exceeds a predetermined operating temperature thermal reduction steps are taken, such as a reduction in the operating frequency of the processor until the temperature is within an acceptable range. However, these monitoring schemes do not provide a system-wide solution to system monitoring.

Often in a large network of computer systems, specific people are designated to resolve problems that arise with respect to computer systems on the network. In general, the user of a specific computer system is not the person designated and/or equipped to solve problems related to his/her computer system. In such a situation the person(s) designated to resolve problems of computer systems must be informed of the problem before the problem can be resolved. The user of the computer system must then wait for the problem to be resolved.

Such prior art network system management schemes therefore require a user of a particular computer system to determine that a problem exists with respect to the computer system, notify an individual or group designated to resolve the particular problems, and then wait for the problem to be resolved. This reduces a computer user's productivity because the person must discover the problem and then request and wait for assistance. This is particularly inefficient when the problem could have been resolved without the person being without the services of the computer system, for example, when a component fails during non-working hours. Further, the prior art computer system management schemes described provide no protection against theft or notification of missing components.

What is needed is an improved system management scheme that monitors multiple system components and automatically generates messages indicating problems associated with the computer system.

SUMMARY OF THE INVENTION

A method and apparatus for monitoring an electronic system with a system management controller is described. A management circuit coupled to an interface and to multiple system components. The management circuit monitors the multiple system components and automatically sends a message to a remote device in response to one or more of the multiple system components operating outside of a predetermined operating range for the specific component. The management circuit obtains a network identifier for the electronic system to communicate with remote devices. The management circuit further maintains a Transmission Control Protocol/Internet Protocol (TCP/IP) stack to maintain communications with the remote device.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and apparatus for monitoring an electronic device with a system management controller is described. In the following description, numerous details are set forth, such as particular bus protocols, functional units, interfaces, etc. It will be apparent, however, to one skilled in the art, that the present invention may be practiced without these specific details. In other instances, structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention provides a system management controller that monitors the status of various system components to determine whether the respective system components are operating within respective predetermined operating ranges. The system management controller is capable of taking corrective action. In one embodiment, a system management controller runs a Transmission Control Protocol/Internet Protocol (TCP/IP) stack independent of the system and reports problems to a network server or other remote device. In one embodiment, the system management controller obtains a Media Access Controller (MAC) address and communicates operating faults to the remote device. In an alternative embodiment, the system management controller communicates system component faults to a remote device via a modem or other device.

In one embodiment, in addition to detecting system component failures, the system management controller of the present invention detects whether system components have been unexpectedly removed from the electronic device, for example, as the result of a theft or destruction. The missing system components can thereby be replaced more quickly than if the computer system user were required to determine the absence of a particular system component, or if the computer system user removed the missing component.

Figure 1:
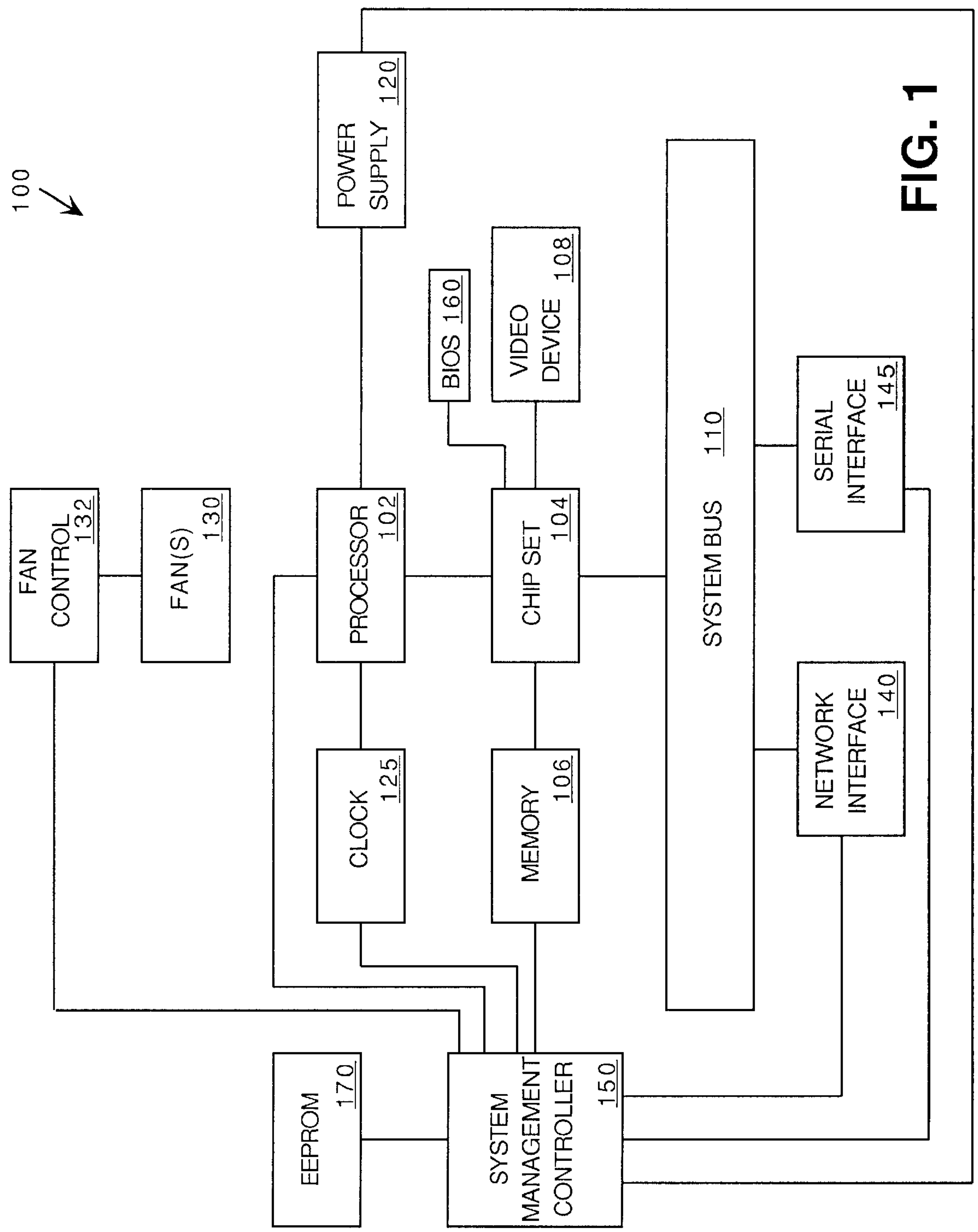
FIG. 1 is a computer system having a system management controller according to one embodiment of the present invention.

FIG. 1 is a computer system having a system management controller according to one embodiment of the present invention. Computer system 100 of FIG. 1 is one embodiment of a personal computer system or other computer system. However, the invention is not limited to use with a personal computer system or similar computer system. For example, the invention can be used with a mainframe computer system, a server, a network computing device, a hand-held computer system, network components such as routers and hubs, etc.

System bus 110 is a device that interconnects multiple system components. In one embodiment system bus 110 is a Peripheral Component Interconnect (PCI) bus as set forth in PCI Local Bus Specification 2.0, published Apr. 30, 1993 by the PCI Special Interest Group of Hillsboro, Oreg. Alternatively, other types of busses can be used, for example, an Industry Standard Architecture (ISA) or Extended Industry Standard Architecture (EISA) bus can be used. Multiple busses can also be used to implement computer system 100.

Processor 102 is coupled to system bus 110 via chip set 104. In one embodiment, processor 102 is from the Pentium® family of processors available from Intel Corporation of Santa Clara, Calif., for example, a Pentium® II processor. Chip set 104 is a group of one or more integrated circuit (IC) chips that provide support circuitry and functionality for processor 102 and to provide desired functionality in computer system 100. In one embodiment, chip set 104 is the 440BX chip set available from Intel Corporation. Of course, other chip sets can also be used.

Memory 106 is coupled to chip set 104. In one embodiment, memory 106 is one or more dual in-line memory modules (DIMMs) and one or more read-only memory (ROM) devices. However, memory 106 can also be some other type of memory device, for example, single in-line memory modules (SIMMs) with ROMs, etc. In one embodiment, system management controller 150 can determine the size an configuration of memory 106 by executing memory evaluation code sequences.

Video device 108 is coupled to chip set 104. In one embodiment, video device 108 is an output device such as a cathode ray tube (CRT) or liquid crystal display (LCD) and supporting circuitry. In one embodiment, system management controller 150 can determine the type of video hardware available.

Basic Input/Output System (BIOS) 160 is also coupled to chip set 104. BIOS 160 provides low level control of computer system 100. For example, BIOS 160 can be used to boot computer system 100 to an operating system that can in turn be used to control computer system 100.

Clock circuit 125 is coupled to processor 102 to provide driving clock signal. Clock circuit 125 can be coupled to other components of computer system 100 (connections not shown in FIG. 1) to provide driving clock signals to other components. Computer system 100 can also include multiple clock circuits (not shown in FIG. 1). The multiple clock signals can be used to drive various system components.

Fan(s) 130 represent one or more fans in computer system 100 to dissipate heat from system components causing excessive heat. In one embodiment, a fan is placed to cause air flow across processor 102, which may have a heat sink thermally coupled thereto. Additional fans can be used to dissipate heat from other components such as power supply 120. Fan control 132 is couples to the one or more fans 130 to control the operation of the fan(s).

Power supply 120 provides power to processor 102. Power supply 120 also provides power to other components of computer system 100; however, connections between power supply 120 and the other components are not shown for reasons of simplicity.

Network interface 140 provides computer system 100 with network access. In one embodiment, network interface 140 includes a Media Access Control (MAC) circuit coupled to an RJ45 adapter to provide Ethernet® access for computer system 100. Alternative network interfaces protocols can also be used. Ethernet® is a registered trademark of Xerox Corporation of Rochester, N.Y.

Serial interface 145 provides computer system 100 with access to serial devices such as a keyboard, a mouse, a modem, or other I/O device. Computer system 100 can also include a parallel interface (not shown in FIG. 1) to provide access to parallel devices, such as storage devices. Other peripheral interfaces can also be coupled to system bus 110.

System management controller 150 is coupled to multiple system components. In one embodiment, system management controller 150 is coupled to fan controller 132, processor 102, clock circuit 125, memory 106, network interface 140, serial interface 145, and power supply 120. System management controller 150 can be coupled to different or additional system components. In one embodiment, system management controller 150 is an embedded microcontroller described in greater detail below. Alternatively, system management controller 150 is an application-specific integrated circuit (ASIC).

In one embodiment, system management controller 150 is coupled to multiple components of computer system 100 via one or more busses, such as the SMBus® available from Intel Corporation. Alternatively, the $I^2C$® bus available from Philips Semiconductors of Sunnyvale, Calif. can also be used. System management controller 150 can also be coupled to each system component of interest individually.

In one embodiment, a single monitoring circuit (not shown in FIG. 1) monitors fan(s) 130 and one or more voltages generated by power supply 120 and the integrity of computer system 100 case (not shown in FIG. 1). In such an embodiment, the monitoring circuit is coupled to system management controller 150. The monitoring circuit can be, for example, the Heceta or Heceta II components available from Intel Corporation.

Electrically Erasable Programmable Read Only Memory (EEPROM, $E^2$PROM) 170 is coupled to system management controller 150. In one embodiment, EEPROM 170 provides instructions and data to system management controller 150 and to network interface 140 as described in greater detail below.

In general, system management controller 150 monitors the operation of multiple system components. If one of the monitored components operates outside of a predetermined operating range, stops functioning or is removed from computer system 100, system management controller 150 detects this condition. In response, system management controller 150 takes corrective action (e.g., increasing fan speed, decreasing operating frequency), if possible. If the corrective action is not successful, system management controller 150 communicates the unexpected condition to a remote device via a network or other condition.

As described in greater detail below, system management controller 150 is capable of maintaining a TCP/IP stack in order to complete network communications independently of the functioning of computer system 100. In one embodiment, system management controller 150 is coupled to or includes an audio component (not shown in FIG. 1). The audio component can be used as an alarm if, for example, a system component is removed or destroyed.

In one embodiment, system management controller 150 responds to polling requests from external devices (e.g., a presence ping from a network device). System management controller 150 responds to the request as appropriate, for example, by describing a system configuration, capability and/or functional status. In one embodiment, system management controller 150 can perform bus transactions via system bus 110 to check memory 106 (e.g., CMOS configuration), peripherals, PCI devices, ISA devices, and other devices that can be included in computer system 100.

Figure 2:
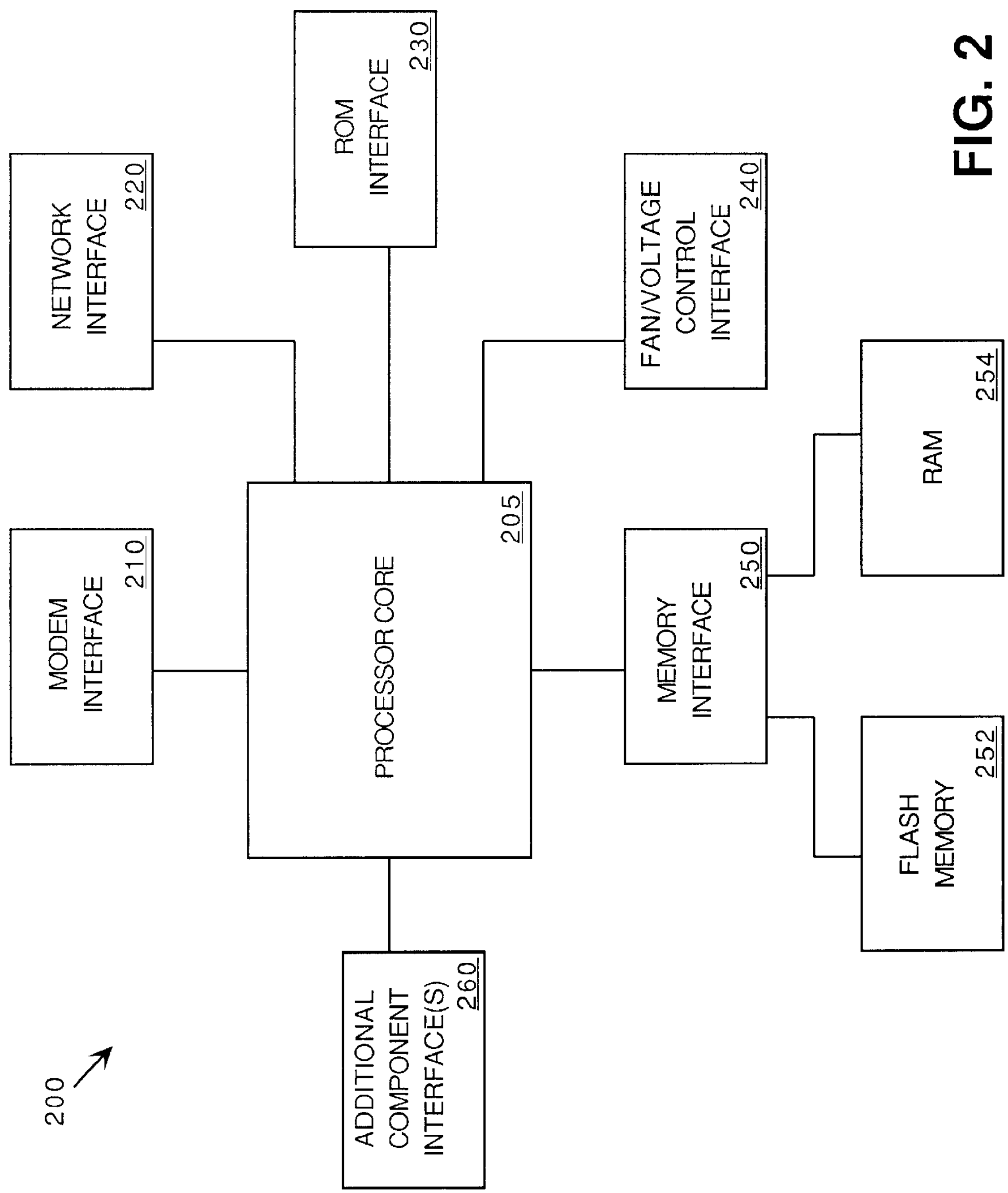
FIG. 2 is a system management controller according to one embodiment of the present invention.

FIG. 2 is a system management controller according to one embodiment of the present invention. In one embodiment, system management controller 200 is based on the 80386 processor core available from Intel Corporation. Alternatively, system management controller can be based on a different architecture, such as a reduced instruction set computing (RISC) architecture or a 68030 processor core available from Motorola, Inc. of Schaumburg, Ill.

In one embodiment, modem interface 210 provides an interface to communicate with a modem (not shown in FIG. 2). In alternative embodiments, modem interface is replaced by, or provided in addition to, a serial communications interface such as RS232. Modem interface 210 allows system management controller 200 to communicate with remote devices via a modem or serial communications device(s).

Network interface 220 provides an interface to network components. In one embodiment, system management controller 200 maintains a TCP/IP stack in order to provide network communications when a system in which system management controller 200 is included is malfunctioning, components are unexpectedly removed, etc.

By maintaining a TCP/IP stack independent of the system in which system management controller 200 is included, system management controller 200 can communicate with remote devices via a network communication when the system otherwise could not communicate via a network connection. This allows system management controller 200 to communicate malfunctions, failures, etc. via a network connection.

ROM interface 230 provides an interface to access a ROM device. In one embodiment, an EEPROM (not shown in FIG. 2) is accessed by processor core 205 via ROM interface 230. In one embodiment, both network interface 220 and ROM interface 230 include MICROWIRE™ interfaces available from National Semiconductor of Santa Clara, Calif. and are described in greater detail below.

Fan/voltage control interface 240 allows processor core to monitor and control one or more fans (not shown in FIG. 2) and power supply voltage levels. In one embodiment, fan/voltage control interface 240 provides access to a Heceta or Heceta II device. Alternative fan and/or voltage monitor/control device(s) can also be used instead of the Heceta devices. Fan and/or voltage monitoring/control are described in greater detail below.

In one embodiment, system management controller 200 monitors the temperature of one or more system components (e.g., a processor package) to determine whether the components are operating within a predetermined temperature range via the Heceta device. For example, if a temperature is too high, the speed of an associated fan is increased. Similarly, of a temperature is within a predetermined low range the speed of the associated fan could be reduced to reduce system noise and/or power consumption.

Figure 3:
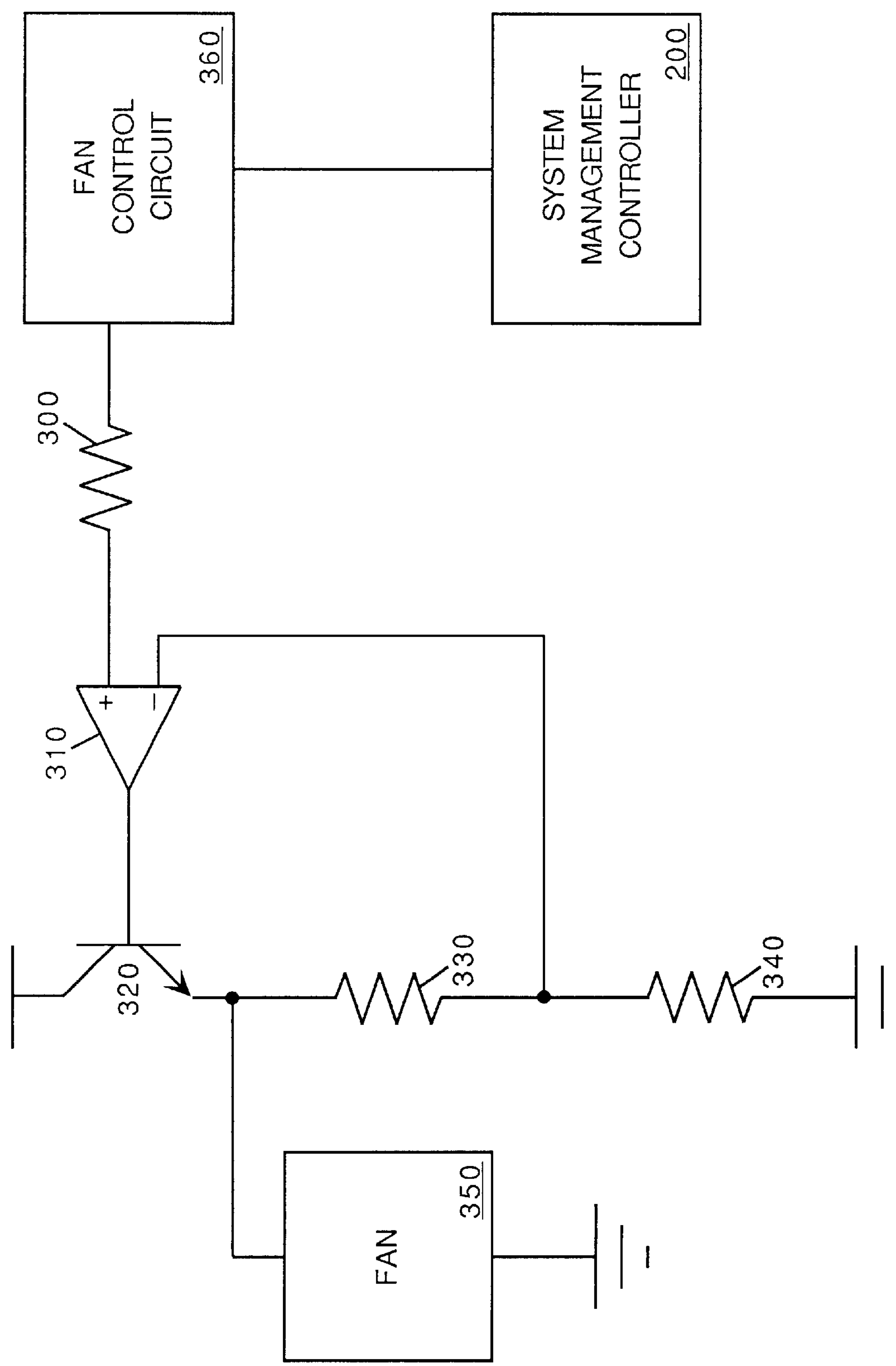
FIG. 3 is a fan control circuit suitable for use with the present invention.

FIG. 3 is a fan control circuit suitable for use with the present invention. In one embodiment, fans are operated in a pulse width modulated (PWM) manner. System management controller 200 is coupled to fan control circuit 360 to communicate information related to fan control. In one embodiment, system management controller 200 includes two 8-bit programmable pulse width modulators that output a fixed frequency, variable duty cycle (0% to 100%) waveform to control two fans. An 8-bit embodiment provides 0.39% duty cycle granularity. In this manner, software executed by system management controller 200 can set fan speed(s). In one embodiment, fan speed parameters are user-configurable.

In one embodiment, fan control circuit 360 is part of a Heceta IC and digital signals output by fan control circuit 360 are converted to analog signals to control a fan by a circuit such as the circuit of FIG. 3. Fan control circuit 360 outputs a PWM signal to the positive input terminal of operational amplifier 310 through resistor 300.

The output of operational amplifier 310 is coupled to the base of transistor 320. Fan 350 and resistor 330 are coupled to the emitter of transistor 320. The collector of transistor 320 is coupled to a supply voltage. The negative input to operational amplifier 310 is coupled to the opposite terminal of resistor 330 as the output of operational amplifier 310. Resistor 340 is coupled between the negative terminal of operational amplifier 310 and ground. Other circuits (e.g., digital to analog converters) can be used to provide a control signal to fan 350.

In one embodiment additional circuitry (not shown in FIG. 3) monitors voltage levels in the system in which system controller 200 is used. Voltage monitoring circuits are known in the art, and any voltage monitoring circuit can be used. If one or more voltages in the system are not within predetermined acceptable operating range(s), system management controller 200 sends a message to a remote device indicating that one or more voltages are out of range. As discussed above, messages can be communicated either via a modem, other serial communication, or network communication.

Returning to FIG. 2, in one embodiment, memory interface 250 provides access to flash memory 252 and RAM 254. Memory interface 250 includes address, data and control interfaces that allow processor core 205 to access data and instructions stored in flash memory 252 or RAM 254. In one embodiment, flash memory 252 is a 128 k×8 device and RAM 254 provides 32 kbytes of memory. Of course, other memory sizes and types can be used.

In one embodiment, flash memory 252 includes a BIOS that is sufficient to boot the system from a network device or other external device if the system ROM is removed. By booting the system from memory other than the system ROM, the system management controller can use external resources to, for example, run diagnostic procedures to determine why the system is malfunctioning.

Additional component interface(s) 260 provide access to additional system components and/or devices not described with respect to FIG. 2. In one embodiment, additional component interface(s) are in the form of $I^2C$® bus interfaces; however, any other coupling can be used to provide access to additional components.

In one embodiment, system management controller 200 monitors a wired-OR of all interrupt lines in the system. If an interrupt persists for more than a predetermined period of time, system management controller 200 assumes that the interrupt has caused the system to crash and system management controller 200 sends a message to a remote device.

In one embodiment, system management controller 200 monitors power-on self test (POST) codes in the system. If a POST failure occurs, system management controller 200 sends a message to a remote device indicating a POST failure.

In one embodiment, system management controller 200 polls the monitored components of an associated system to determine whether the components are present. Lack of a response to the polling action indicates a non-functioning, a malfunctioning, or a missing component. Each of these conditions cause a message to be sent to a remote device.

Figure 4:
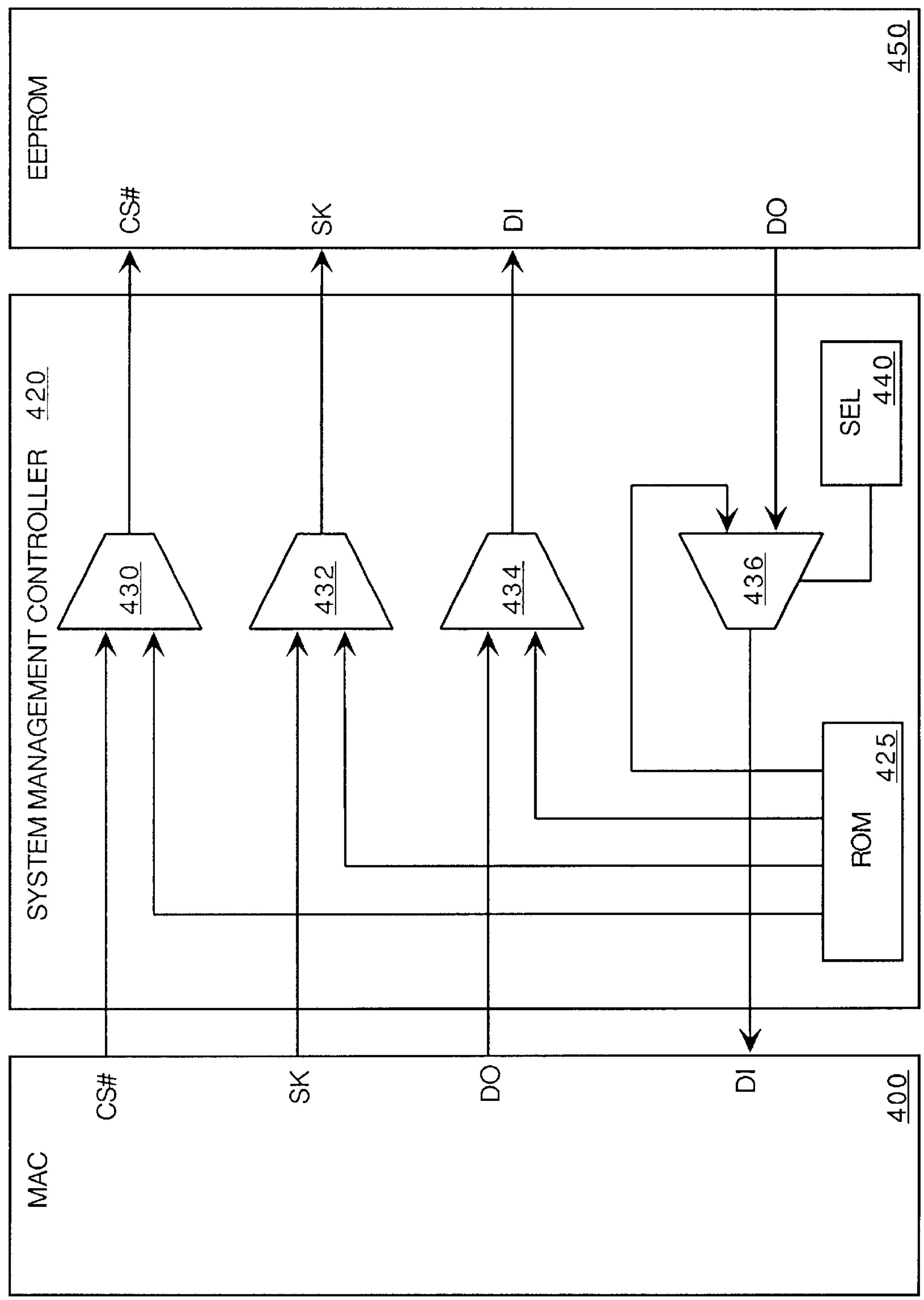
FIG. 4 is an interface for use with a system management controller according to one embodiment of the present invention.

FIG. 4 is an interface for use with a system management controller according to one embodiment of the present invention. In one embodiment, a MICROWIRE™ interface is used to interconnect an Ethernet® MAC device, a system management controller, and a ROM device (e.g., EEPROM). The MICROWIRE™ interface is a serial interface that allows MAC 400 and EEPROM 450 to intercommunicate during normal operation and the system management controller to communicate with MAC 400 as if the system management controller were EEPROM 450 under certain conditions. The MICROWIRE™ interface can be replaced with a Serial Peripheral Interface™ (SPI™) available from Motorola, Inc. or another interface.

MAC 400 provides access to a network (not shown in FIG. 4) in any manner known in the art. In one embodiment system management controller 420 is coupled to MAC 400 via a 4-line MICROWIRE™ interface. Similarly, EEPROM 450 is coupled to system management controller 420 via a 4-line MICROWIRE™ interface. The CS# signal is a low-asserted chip select signal, the SK signal is a clock signal, the DI signal is a data input signal, and the DO signal is a data output signal.

In one embodiment, the lines coupling MAC 400 and EEPROM 450 are coupled to multiplexors (e.g., 430, 432, 434 and 436) of system management controller 420. The multiplexors also receive input signals from ROM 425 of system management controller 420 and are controlled by select circuit 440. In normal operation select circuit 440 causes the multiplexors to pass signals between MAC 400 and EEPROM 450.

Under certain conditions select circuit 440 causes MAC 400 to receive data from ROM 425. The configuration of FIG. 4 allows system management controller 420 to "snoop" transactions with MAC 400, which allows system management controller 420 to obtain the network address of the system in which system management controller 420 operates. In one embodiment, the system is powered up and MAC 400 is reset to obtain the MAC address of the system.

In this manner, system management controller 420 can maintain a network connection independent of the computer system in which system management controller 420 operates. Maintenance of a network connection in combination with an independent TCP/IP stack maintained by system management controller 420 allows system management controller to communicate via a network independent of the system in which system management controller 420 operates.

In one embodiment system management controller 420 retrieves non-volatile system management data from EEPROM 450. For example, system management data can include: the system serial number, the pager number of a person responsible to repair the system, voltage trip point(s), temperature trip point(s), fan trip point(s), etc.

Figure 5:
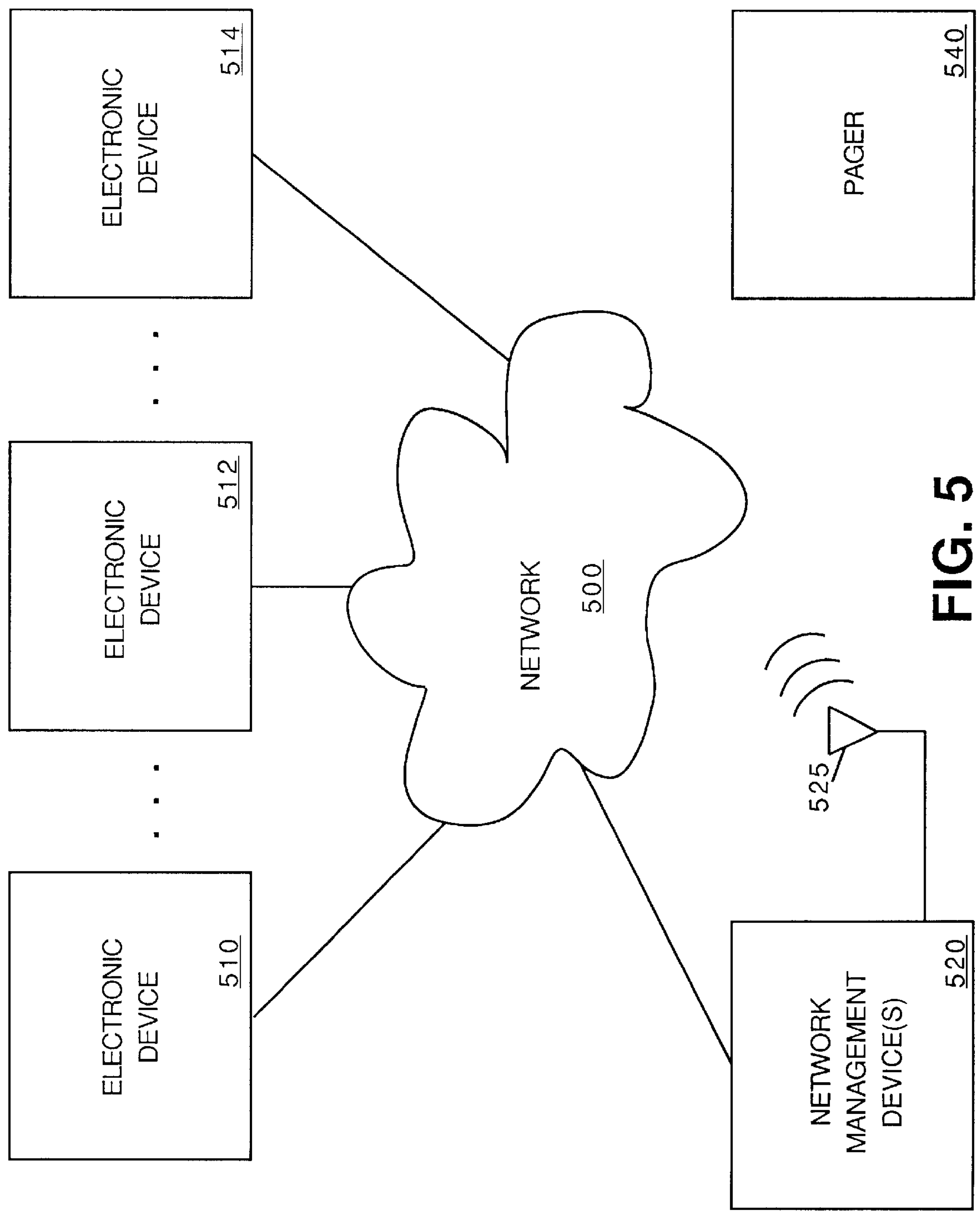
FIG. 5 is a network of electronic devices that automatically send messages in response to predetermined conditions according to one embodiment of the present invention.

FIG. 5 is a network of electronic devices that automatically send messages in response to predetermined conditions according to one embodiment of the present invention. In one embodiment, the electronic devices of FIG. 5 (e.g., 510, 512, 514), are computer systems, such as computer system 100 of FIG. 1.

Electronic devices 510, 512 and 514 are coupled to network 500. In one embodiment, network 500 is a local area network (LAN); however, network 500 can be any type of network, such as the Internet. Network 500 can also be a wireless network, or a telephone network.

Network management device(s) 520 represent one or more devices that can be used to manage network 500 and devices coupled thereto. For example, computer system(s) running network software tools that allow network administrators monitor network traffic, configurations, etc.

In one embodiment one or more of network management device(s) 520 is coupled to antenna 525. The coupling can be either direct or indirect, for example, via a telephone network. Antenna 525 sends a message to pager 540 that is carried by a network administrator or repair personnel. For example, if a specific computer system is overheating the following message can be sent to pager 540: "00A012345678, System temperature of 89 F. is over limit of 70 F."

Thus, an electronic device sends a message via network 500 to network management device(s) 520 indicating an unexpected event. If the condition causing the event can be resolved by network management device(s) 520 (e.g., providing boot code), network management device(s) 520 automatically resolve the condition. Otherwise, a message is communicated to pager 540.

Devices other than, or in addition to, pager 540 can be used inform a network administrator or repair personnel of an unexpected event. For example, an electronic mail message could be sent, a telephone call could be placed, a flashing light could be lit, etc.

Figure 6:
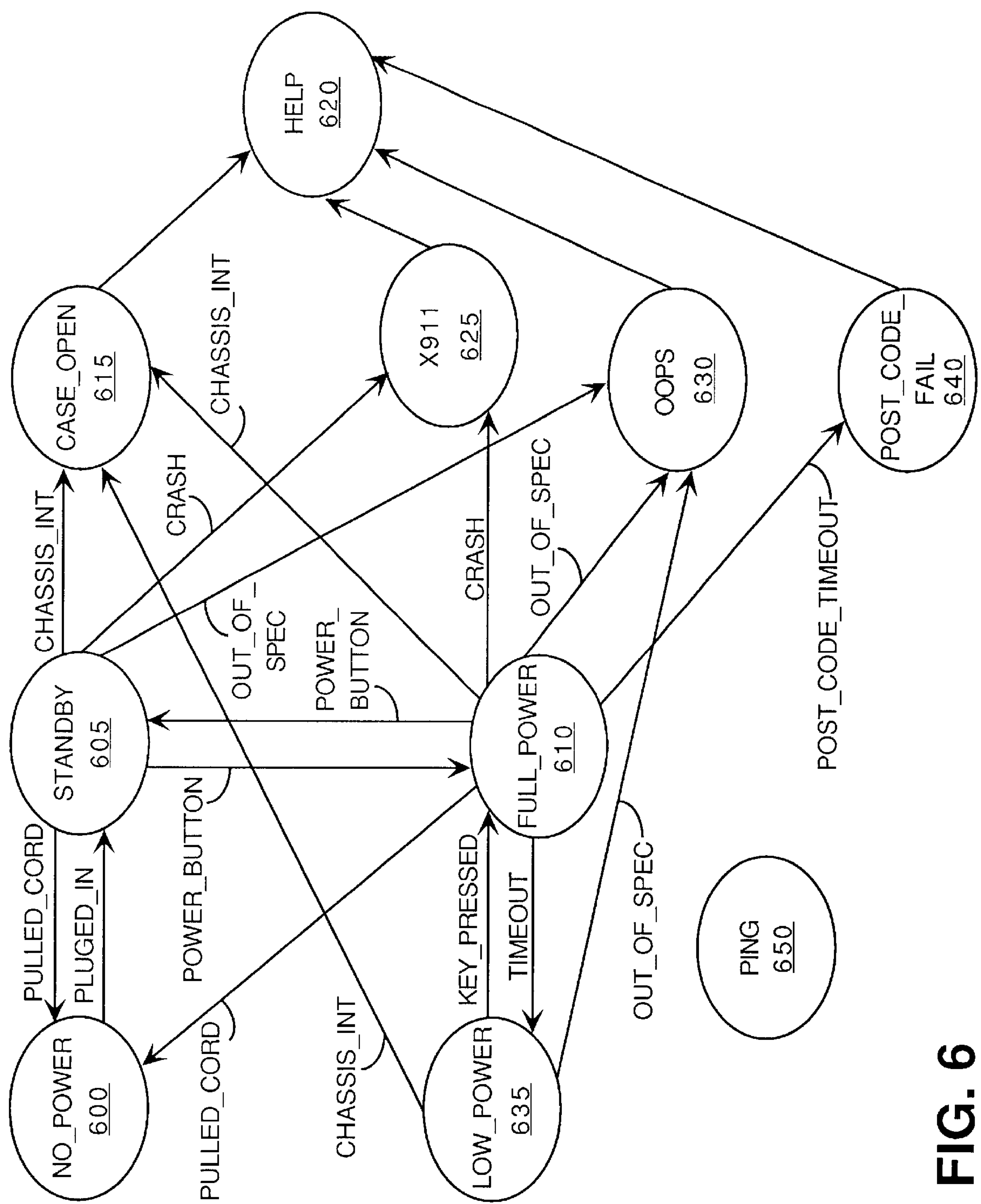
FIG. 6 is a state diagram of a system management controller according to one embodiment of the present invention.

FIG. 6 is a state diagram of a system management controller according to one embodiment of the present invention. The system management controller starts in state 600 (NO_POWER), when the electronic device monitored is without power. When the electronic device is provided with power, the system management controller moves to state 605 (STANDBY). The transition is labeled PLUGED_IN; however, physically plugging in the electronic device is not required.

If power is lost while in state 605, the system management controller moves back to state 600. The transition is labeled PULLED_CORD; however, physically pulling the power cord is not necessary. State 605 indicates that power is available to the electronic device and not that the electronic device has been powered up or turned on.

If the electronic device is powered up in state 605, the system management controller moves that state 610 (FULL_POWER). The transition is labeled POWER_BUTTON, suggesting that a power button on the electronic device is pressed to turn the device on. If the power button is pressed in state 610, the device is turned off and the system management controller moves back to state 605. The transition from state 610 to state 605 is also labeled POWER_BUTTON. In one embodiment, the power levels related to states 600, 605 and 610 are monitored by a Heceta IC.

If the case or chassis of the electronic device is opened during state 605, the system management controller moves to state 615 (CASE_OPEN). The transition is labeled CHASSIS_INT. In one embodiment, the Heceta device is used to determine whether the case has been opened. From state 615, the system management controller moves to state 620 (HELP). In state 620, the system management controller sends one or more messages indicating the nature of the event that caused the system management controller to be in state 620.

From state 605, the system management controller can move to state 625 (X911) as the result of a "crash," which as used with respect to FIG. 6 refers to an OR output of all interrupt lines staying high for more than one second. Other definitions of a system crash can also be used. The transition from state 605 to state 625 is labeled CRASH. From state 625, the system management controller moves to state 620 to send a message indicating a crash has occurred.

From state 605, the system management controller can move to state 630 (OOPS) as the result of one or more system components operating outside of the respective predetermined operating ranges. The transition from state 605 to state 630 is labeled OUT_OF_SPEC. Determining whether a system component is operating outside of a predetermined range is described in greater detail above. From state 630, the system management controller moves to state 620 to send a message indicating that a system component is operating outside of the predetermined operating range.

From state 610, the system management controller can move to state 615, 625 or 630 for the same reasons as described above with respect to state 605. The transitions are labeled CHASSIS_INT, CRASH and, OUT_OF_SPEC, respectively in FIG. 6. The system management controller can also move to state 600 as a result of loss of power. The transition between states 610 and 600 is labeled PULLED_CORD in FIG. 6.

The system management controller moves from state 610 to state 640 (POST_CODE_FAIL) in response to a POST code failure, as discussed above. The transition is labeled POST_CODE_TIMEOUT in FIG. 6. From state 640, the system management controller moves to state 620 to send a message indicating a POST code failure.

The system management controller can move from state 610 to state 635 (LOW_POWER). This transition is the result of system inactivity for a predetermined period of time. The transition is labeled TIMEOUT in FIG. 6. The system management controller returns to state 610 from state 635 as a result of system activity. The transition is labeled KEY_PRESSED in FIG. 6; however, activity other than pressing a key can cause the system management controller to move from state 635 to state 610. From state 635, the system management controller can also move to states 615 and 630 as the result of an unexpected case opening (CHASSIS_INT) or a component operating outside of a predetermined operating range (OUT_OF_SPEC), respectively.

State 650 (PING) is an independent state that can be entered from any of the states discussed above. State 650 is caused as the result of a message received form an external device testing for the presence of the system or requesting information from the system. System management controller responds to the message appropriately and returns to the state when the message was received. Conceptually, the ping message is similar to an interrupt within a computer system. Normal operation is interrupted while the interrupt/ping is processed, after which normal operation resumes.

Figure 7:
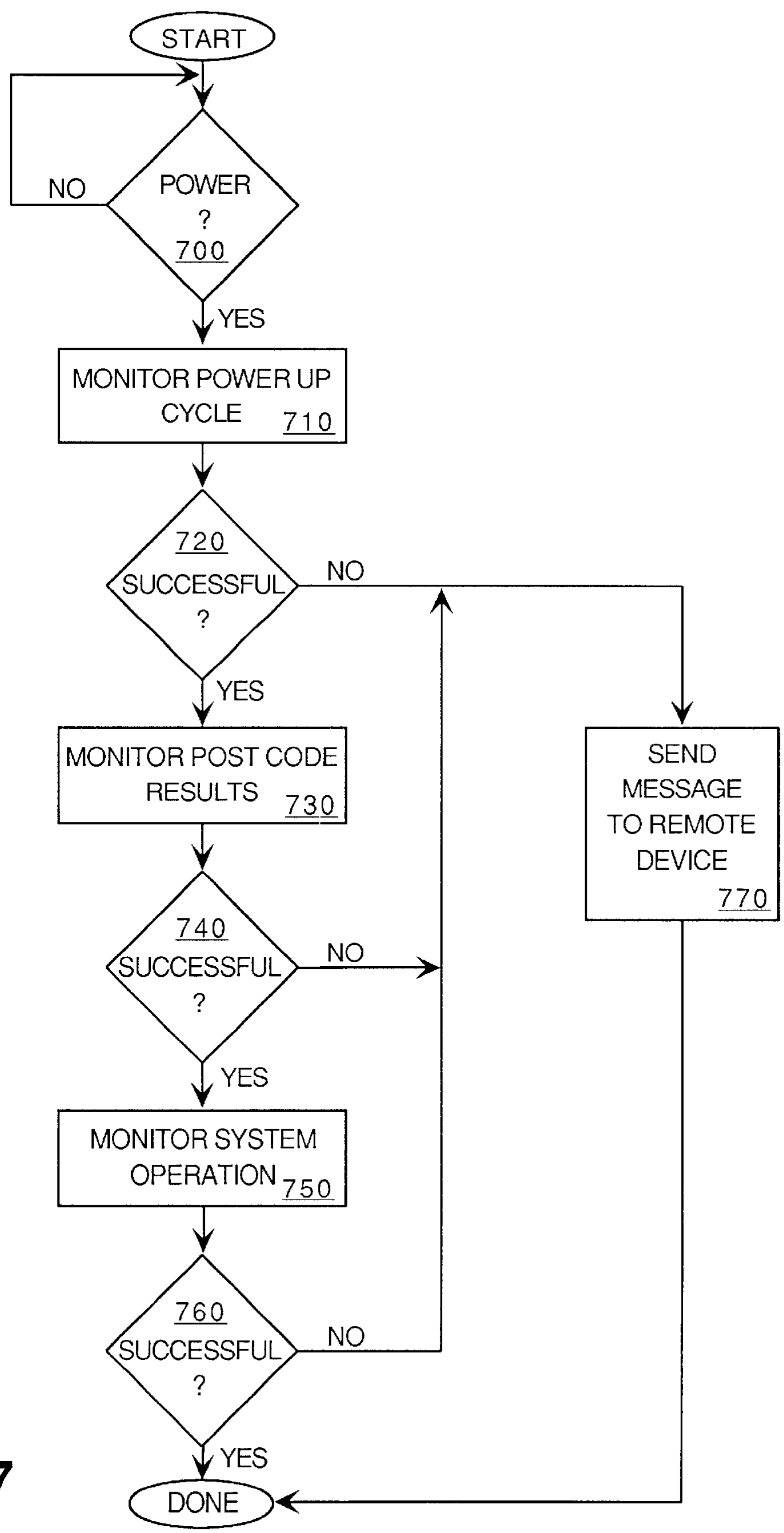
FIG. 7 is a flow diagram of system management controller operation according to one embodiment of the present invention.

FIG. 7 is a flow diagram of system management controller operation according to one embodiment of the present invention. The system management controller waits until power is supplied, 700.

If power is supplied at 700, the system management controller monitors the power up cycle, 710. Monitoring the power up cycle is described in greater detail above. If the power up cycle is not successful at 720 a message indicating that the power up cycle was not completed is sent to a remote device, 770.

If the power up cycle is completed successfully at 720, the system management controller monitors POST code results, which is described in greater detail above. If the POST codes indicate that completion was not successful at 740, a message is sent to a remote device indicating the result, 770.

If the POST codes indicate a successful result at 740, the system management controller monitors system operation, 750. If system operation is not successful at 760 (e.g., operating temperature too high, operating voltage too low), a message is sent to a remote device, 770. System operation is monitored until operation is complete.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An electronic system comprising:

a first interface to provide network access to the electronic system;

a monitoring interface to communicate with a remote device independently of the first interface;

multiple system components within the electronic system; and a management circuit within the electronic system coupled to the monitoring interface and to the multiple system components, the management circuit to monitor the multiple system components and automatically send a message to the remote device in response to one or more of the multiple system components operating outside of a predetermined operating range for the specific component, further wherein the management circuit obtains a network identifier for the management circuit to communicate with remote devices via the monitoring interface and maintains an independent network connection through the monitoring interface to maintain communications with the remote device.

2. The apparatus of claim 1 wherein the network identifier comprises a Media Access Control (MAC) address to communicate with the remote device independent of the electronic device.

3. The apparatus of claim 1 wherein the message is in response to and indicates that a chassis containing the electronic device has been unexpectedly opened.

4. The apparatus of claim 1 wherein the message is in response to and indicates that an operating temperature of at least one of the multiple system components is outside a predetermined operating range.

5. The apparatus of claim 1 wherein the message is in response to and indicates that an operating voltage of at least one of the multiple system components is outside a predetermined operating range.

6. The apparatus of claim 1 further comprising one or more fans coupled to the control circuit, wherein the management circuit controls operating characteristics of the one or more fans based on an operating temperature of at least one of the multiple system components.

7. The apparatus of claim 1 wherein the management circuit monitors results of a power-on self test (POST) sequence to determine whether the multiple system components are operating with acceptable operating characteristics.

8. A method comprising:

monitoring multiple system components of the electronic device with a monitoring component within the electronic device;

initiating a network connection with a management circuit to a remote device independent of a processor within the electronic device communicating with a network device;

generating, automatically, a message to the remote device in response to one or more of the system components not operating within the predetermined operating ranges; and sending the message.

9. The method of claim 8 wherein the management circuit obtains a Media Access Control (MAC) address to communicate with the remote device.

10. A machine-readable medium having stored thereon sequences of instructions, which when executed by a system management circuit cause the system management circuit to:

monitor multiple system components of the electronic device with a monitoring component within the electronic device;

initiate a network connection with a management circuit to a remote device independent of a processor within the electronic device communicating with a network device;

generate, automatically, a message to the remote device in response to one or more of the system components not operating within the predetermined operating ranges; and send the message.

11. The machine-readable medium of claim 10 further comprising sequences of instructions that cause the system management circuit to obtain a Media Access Control (MAC) address to communicate with the remote device.

12. An apparatus comprising:

means for monitoring multiple system components of the electronic device with a monitoring component within the electronic device;

means for initiating a network connection with a management circuit to a remote device independent of a processor within the electronic device communicating with a network device;

means for generating, automatically, a message to the remote device in response to one or more of the system components not operating within the predetermined operating ranges; and means for sending the message.

13. The apparatus of claim 12 further comprising means for independently obtaining a Media Access Control (MAC) address with the control circuit to communicate with the remote device.

14. A management circuit within an electronic system coupled to a monitoring interface and to multiple system components within the electronic system, the management circuit to monitor the multiple system components and automatically send a message to a remote device in response to one or more of the multiple system components operating outside of a predetermined operating range for the specific component, further wherein the management circuit obtains a network identifier for the management circuit to communicate with remote devices via the monitoring interface and maintains an independent network connection through the monitoring interface to maintain communications with the remote device.

15. The management circuit of claim 14 wherein the network identifier comprises a Media Access Control (MAC) address to communicate with the remote device independent of the electronic device.

16. The management circuit of claim 14 wherein the message is in response to an indicates that a chassis containing the electronic device has been unexpectedly opened.

17. The management circuit of claim 14 wherein the message is in response to and indicates that an operating temperature of at least one of the multiple system components is outside a predetermined operating range.

18. The management circuit of claim 14 wherein the message is in response to and indicates that an operating voltage of at least one of the multiple system components is outside a predetermined operating range.

19. The management circuit of claim 14 wherein the management circuit monitors results of a power-on self test (POST) sequence to determine whether the multiple system components are operating with acceptable operating characteristics.

* * * * *